Feb. 27, 1945.  H. A. SHERRY  2,370,427
PORTABLE RAMP FOR VEHICLES
Filed July 24, 1944
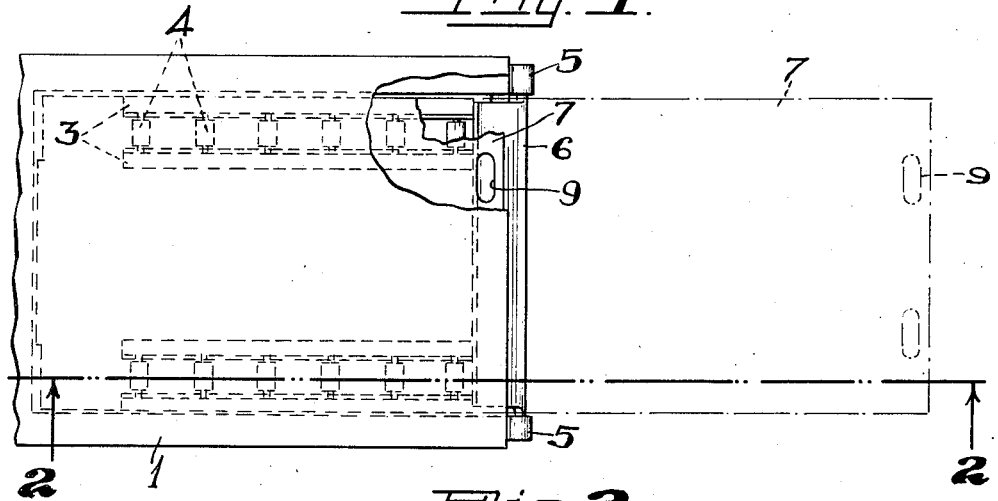
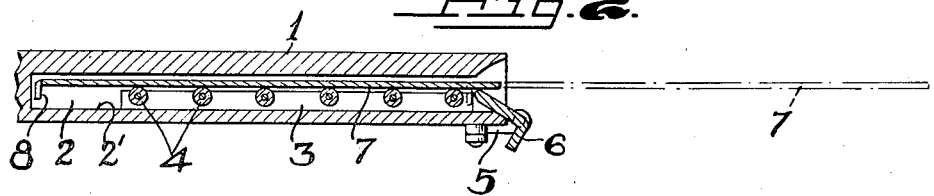
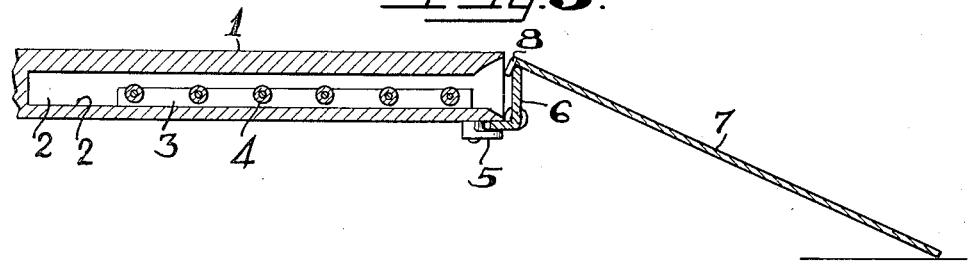
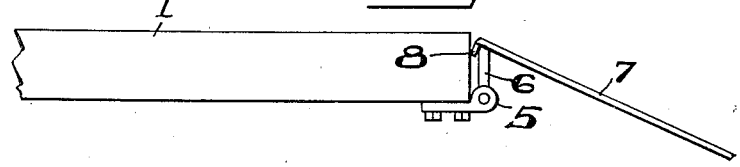
INVENTOR.
Henry A. Sherry
BY
J. E. Trabucco
ATTORNEY Patented Feb. 27, 1945

2,370,427

UNITED STATES PATENT OFFICE 2,370,427

PORTABLE RAMP FOR VEHICLES

Henry A. Sherry, San Bruno, Calif.

Application July 24, 1944, Serial No. 546,422

3 Claims. (Cl. 214—85)

This invention relates to improvements in truck ramps, and it has for its primary object the provision of an extensible ramp for trucks or other vehicles.

Another object of my invention is to provide a portable ramp for use with trucks, airplanes or other vehicles, embodying a novel arrangement permitting the ramp to be conveniently extended from a concealed out-of-the-way position to one in which it is ready for use.

A further object of my invention is to provide a portable loading ramp of the kind characterized, embodying novel means arranged in combination with a truck or other vehicle whereby the ramp may be readily shifted from an operative inclined position to one in which it is concealed and safely stored, but where at the same time it is available for further use wherever the vehicle might be located.

Other and further objects of my invention will be pointed out hereinafter, or will be indicated in the appended claims, or will be obvious to one skilled in the art upon an understanding of the present disclosure. For the purpose of this application, I have elected to show certain forms and details of a portable loading ramp for vehicles representative of my invention; it is to be understood, however, that the embodiment of my invention herein shown and described is for the purpose of illustration only, and that therefore it is not to be regarded as exhaustive of the variations of the invention, short of the true and most comprehensive scope of the invention in the art.

In the accompanying drawing:

Fig. 1 is a plan view of an extensible loading ramp for trucks or other vehicles, showing certain parts broken away;

Fig. 2 is a sectional view taken on the line 2—2 of Fig. 1;

Fig. 3 is a view similar to Fig. 2, showing the ramp in an extended operable position; and Fig. 4 is a side elevation of the ramp in an extended position.

Referring to the drawing, the numeral 1 designates the floor, bed or other supporting structure of a truck, airplane, railroad car or other vehicle. For the sake of clearness and brevity the wheels and other parts of the vehicle upon which the supporting structure 1 is mounted have not been illustrated on the drawing.

The supporting structure 1 is provided with a substantially rectangular compartment or space 2 which is provided with an enlarged opening at its rear end. Mounted inside the compartment on the floor 2' thereof are pairs of spaced elongated supporting members 3 which rotatably support a plurality of spaced rollers 4. Other types of rollers may also be used. Secured to the underneath side of the supporting structure 1 at the rear end thereof are lugs 5 upon which an angle bar 6 is pivotally mounted at its opposite ends. The angle bar is provided with a lower part which is adapted to engage with the supporting structure, thereby normally maintaining the upper part thereof in a vertical position and preventing the latter from moving rearwardly beyond this position.

Arranged for movement into and out of the compartment 2 is an elongated ramp 7 which has its forward end bent downwardly or hooked as at 8 and its opposite end provided with hand openings 9 for convenience in handling. The ramp is substantially rectangular in shape and its length is such that it assumes a suitable inclined position when its rear end is resting on the ground or other supporting surface. The length and width of the compartment 2 is slightly greater than the corresponding dimensions of the ramp, thereby permitting the latter to be suitably housed in the compartment when not in use. The ramp, when positioned inside the compartment 2, rests on the rollers 4, and the latter permits the effortless movement of the ramp into and out of the compartment. The hooked forward end 8 of the ramp is so proportioned and arranged with respect to the innermost of the roller supporting members 3 that there is no interference when the ramp is moved into and out of the compartment.

When the ramp is pulled rearwardly its hooked forward end 8 engages with the upper part of the angle bar 6 and carries the latter to a vertical position. As soon as the angle bar assumes a position whereby its lower part engages with the supporting structure 1, as shown in Fig. 3, the upper vertically disposed part thereof acts as a stop to prevent the ramp from being moved further to the rear. When the angle bar has been thus moved to a position where its upper part is vertically disposed the ramp is supported at its forward end in a position directly adjacent the rear end of the upper surface of the supporting structure 1, thereby permitting freight to be wheeled or otherwise moved up the ramp and onto the said supporting structure. A downward pressure upon the ramp will not cause a displacement of the angle bar 6 from a position in which its upper part is vertically disposed.

The enlarged rear end of the compartment 2 is shaped so as to permit the forward end of the ramp to pass therethrough when the latter is moved forwardly to a retracted position inside the said compartment. When the rear end of the ramp is lifted and pushed in a forward direction the angle bar 6 will turn in a counter-clockwise direction and allow the forward end of the said ramp to enter the rear end of the compartment.

While the supporting structure 1 is shown as having a space or compartment, the bottom of which provides a supporting member, it is to be understood that any other suitable arrangement may be employed for supporting the ramp in a retracted position beneath the upper surface of the supporting structure.

What I claim is:

1. In combination with an elevated supporting structure forming a part of a vehicle, ramp supporting means carried by and positioned beneath the supporting structure, a ramp supported on the supporting means and arranged to be extended rearwardly to an inclined position at the rear of the elevated supporting structure, and a pivoted member on the supporting structure for supporting the elevated end of the ramp and for normally preventing its rearward movement therebeyond, the said pivoted member having means for engaging with the supporting member to prevent its pivotal movement beyond a certain position.

2. In combination with an elevated freight supporting structure forming a part of a vehicle, a ramp support positioned beneath and carried by the supporting structure, a plurality of rollers on the ramp support, a ramp retractably supported on the rollers and arranged to be extended rearwardly to an inclined position at the rear of the freight supporting structure, a depending member on the forward end of the ramp, and a pivoted member on the rear end of the supporting structure having a part arranged for engagement by the depending member of the ramp when the latter is retracted, whereby the said member may be pivotally moved to a position in which the forward end of the ramp is prevented from moving rearwardly therebeyond.

3. In combination with an elevated freight supporting structure forming a part of a vehicle, a ramp support positioned beneath and carried by the supporting structure, a ramp normally supported on the support and arranged to be extended rearwardly to an inclined position at the rear of the supporting structure, a depending member on the forward end of the ramp, a pivoted angle bar carried at the rear end of the supporting structure and having a part arranged to be engaged by the depending member of the ramp as the latter is retracted, whereby the forward end of the ramp is prevented from moving therebeyond, the said part of the angle bar being arranged to support the forward end of the ramp in an elevated position adjacent the rear end of the upper surface of the supporting structure, and the said angle bar having another part arranged to engage with means preventing the pivoted movement beyond a certain point, whereby the first mentioned part of the said bar may be normally maintained in a position in which the forward end of the ramp is supported adjacent the upper surface of the supporting structure.

HENRY A. SHERRY.